(12) United States Patent
Chapman (10) Patent No.: US 7,854,555 B2
(45) Date of Patent: Dec. 21, 2010

(54) CAMERA PLATFORM STABILIZING SYSTEMS

(75) Inventor: Leonard T. Chapman, North Hollywood, CA (US)

(73) Assignee: Chapman/Leonard Studio Equipment, Inc., North Hollywood, CA (US)

(*) Notice: Subject to any disclaimer, the term of this patent is extended or adjusted under 35 U.S.C. 154(b) by 559 days.

(21) Appl. No.: 11/836,509

(22) Filed: Aug. 9, 2007

(65) Prior Publication Data

US 2008/0002967 A1    Jan. 3, 2008

Related U.S. Application Data

(63) Continuation-in-part of application No. 11/760,582, filed on Jun. 8, 2007, now Pat. No. 7,311,452, which is a continuation of application No. 11/555,124, filed on Oct. 31, 2006, now Pat. No. 7,252,441, which is a continuation of application No. 10/934,804, filed on Sep. 3, 2004, now Pat. No. 7,128,479, which is a continuation-in-part of application No. 10/791,118, filed on Mar. 1, 2004, now Pat. No. 7,121,745.

(51) Int. Cl.
    *G03B 17/00* (2006.01)
(52) U.S. Cl. .................................... 396/428
(58) Field of Classification Search ................ 396/428; 318/630
    See application file for complete search history.

(56) References Cited

U.S. PATENT DOCUMENTS 2,156,862 A    5/1939  Maugard
2,472,944 A    6/1949  Furer et al.
3,434,025 A *  3/1969  Kennedy et al. ............... 318/8
4,657,220 A    4/1987  Lindsay
4,907,768 A    3/1990  Masseron et al.
4,943,019 A    7/1990  Mester (Continued)

FOREIGN PATENT DOCUMENTS

DE    3628782 A1    3/1998

(Continued)

OTHER PUBLICATIONS

Technovision USA, Inc., Techno Crane Brochure, Sep. 1986.

(Continued)

*Primary Examiner*—W. B. Perkey
(74) *Attorney, Agent, or Firm*—Kenneth H. Ohriner; Perkins Coie LLP (57) ABSTRACT

A camera crane has a telescopically extendible arm with a camera platform supported at the front end of the arm. A mechanical leveling system is linked to the camera platform to keep the camera platform in a substantially horizontal or level position, regardless of the elevation angle of the arm. A counter weight moves along the arm as the arm extends and retracts, to help keep the arm balanced. A stabilizing system provides instantaneous corrective movements to the camera platform, to keep the camera platform level. The stabilizing system includes a sensor for sensing the angular position of the camera platform. An electronic controller provides a positive preload to a first motor, and a negative preload to the second motor, driving the camera platform, to avoid backlash. Upon sensing an out of level position, the controller provides a corrective signal to the motors, causing both motors to drive the camera platform back towards level.

11 Claims, 12 Drawing Sheets

U.S. PATENT DOCUMENTS

| | | |
|---|---|---|
| 4,952,953 A | 8/1990 | Ridderstolpe et al. |
| 5,047,703 A * | 9/1991 | Akamatsu .................. 318/630 |
| 5,124,938 A | 6/1992 | Algrain |
| 5,697,757 A | 12/1997 | Lindsay |
| 5,729,100 A * | 3/1998 | Rothstein et al. ............... 318/7 |
| 5,768,648 A | 6/1998 | Skipp et al. |
| 5,781,814 A | 7/1998 | Chapman |
| 5,856,862 A | 1/1999 | Kokush |
| 5,868,031 A | 2/1999 | Kokush et al. |
| 6,450,706 B1 | 9/2002 | Chapman |
| 6,478,427 B1 | 11/2002 | Morris et al. |
| 6,752,541 B1 | 6/2004 | Dykyj |
| 6,776,488 B2 | 8/2004 | Burbulla |
| 2003/0076480 A1 | 4/2003 | Burbulla |
| 2005/0052531 A1 | 3/2005 | Kozlov |

FOREIGN PATENT DOCUMENTS

| | | |
|---|---|---|
| EP | 1298087 A1 | 4/2003 |
| GB | 2207109 A | 1/1989 |
| JP | 08-068493 | 12/1996 |
| WO | 8910894 A | 11/1989 |
| WO | 9412424 A | 6/1994 |

OTHER PUBLICATIONS

Orion Technocrane, Super Techno Crane Brochure, Sep. 1986.

EPC Communication pursuant to Article 94(3) EPC issued in application No. 05 724 101.0-2209 on Feb. 15, 2010.

* cited by examiner

FIG. 16

CAMERA PLATFORM STABILIZING SYSTEMS

CROSS-REFERENCE TO RELATED APPLICATIONS

This application is a Continuation-in-Part of U.S. patent application No. 11/760,582, filed Jun. 8, 2007, now U.S. Pat. No. 7,311,452, which is a Continuation of U.S. patent application No. 11/555,124, filed Oct. 31, 2006, now U.S. Pat. No. 7,252,441, which is a continuation of U.S. patent application No. 10/934,804, filed Sep. 3, 2004, now U.S. Pat. No. 7,128,479, which is a Continuation-in-Part of U.S. patent application Ser. No. 10/791,118, filed Mar. 1, 2004, now U.S. Pat. No. 7,121,745. All of these applications are incorporated herein by reference.

BACKGROUND OF INVENTION

Camera cranes are often used in motion picture and television production. The motion picture or television camera is typically mounted on a crane arm supported on a mobile base, dolly, or truck. The mobile base may be pushed and steered by hand. Larger units, which have more weight carrying capacity, and longer reaches, typically have electric driving motors powered by onboard batteries. Some mobile bases also including conventional gasoline or diesel engines, may also serve as over the road vehicles.

Camera cranes generally have a crane arm supported on a base, with a camera platform at one end of the arm, and a counter weight at the other end. The crane arm can be pivoted by hand to raise and lower the camera, and also to pan to the left or right side. A leveling system is often included to maintain the camera platform in a level orientation, as the elevation angle of the arm changes. Some mobile bases may include a self leveling or an extendible center post or column, which the crane arm can be mounted on. Even with use of existing leveling systems, under certain conditions, unintended or undesirable camera movements may still occur, due to strain on leveling cables or other crane components, when under high loads. The payload carried by the camera platform, includes the camera, the lens, associated camera accessories such as remote control units, batteries, etc., and any camera head or riser. Accordingly, the payload may exceed 100 pounds, even when using a lightweight camera.

The center of gravity of the payload is almost always displaced from the center of the crane arm. Accordingly, when the payload is accelerated, by movement of the crane arm, or the mobile base supporting the crane, inertial forces act to deflect the camera platform from the desired level position. The camera platform may also be displaced from level by wind forces, additional weight temporarily placed on the platform, hand forces applied by the crane operators, etc. These kinetic factors cause unwanted movement of the lens, which can disrupt the filming or video recorded images. While existing stabilizing systems have met with varying degrees of success, problems remain in providing a stabilizing system able to quickly, accurately, and smoothly counteract the kinetic deflections of the camera platform, without degrading overall crane performance via added weight, bulk, power consumption, or reliability.

Accordingly, various engineering challenges remain in designing a stabilizing system for use in a camera crane.

SUMMARY OF THE INVENTION

A camera crane has a telescopically extendible arm with a camera platform supported at the front end of the arm. A mechanical leveling system keeps the camera platform in a substantially horizontal or level position as the elevation angle of the arm changes. A stabilizing system provides instantaneous corrective movements to the camera platform, to compensate for kinetic forces tending to displace the camera platform from level. The stabilizing system includes a sensor for sensing the position of the camera platform. An electronic controller provides a positive preload to a first motor, with the motors linked to the camera platform, to avoid backlash. Upon sensing an out of level position, the controller provides a corrective signal to the motors, causing the motors to drive the camera platform back towards level.

Other aspects and advantages will be apparent from the following detailed description and drawings. The invention relies as well in sub-combinations and subsystems of the elements described. For example, each of the features listed above can be used as an improvement in a conventional crane design. Alternatively, they may be used in various combinations with each other.

BRIEF DESCRIPTION OF THE DRAWINGS

In the drawings, wherein the same reference number indicates the same element in each of the views.

DETAILED DESCRIPTION OF THE DRAWINGS

Figures 1, 2:
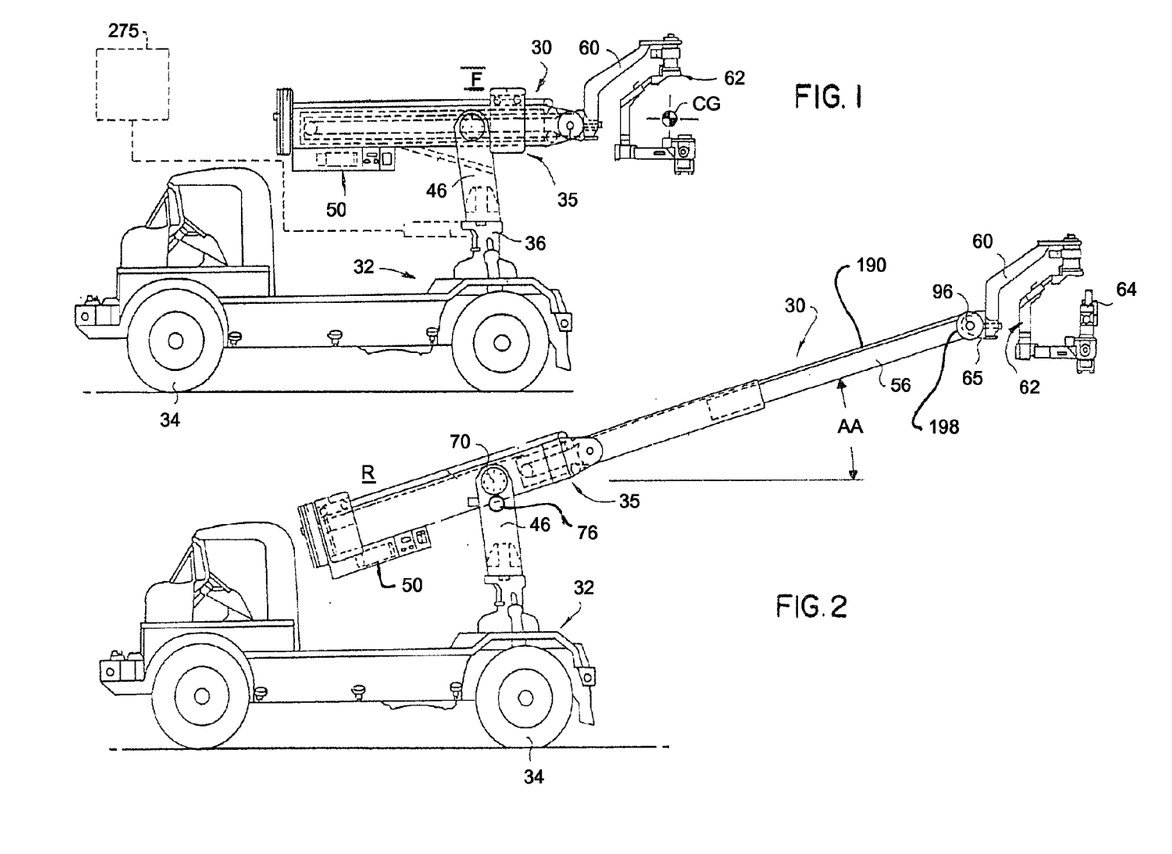
FIG. 1 is a side view of a prior art telescoping crane, mounted on a mobile base or vehicle, with the crane in the retracted position.
FIG. 2 is a side view of the crane shown in FIG. 1, with the arm now fully extended.

Turning now in detail to the drawings, as shown in FIGS. 1 and 2, a telescoping crane 30 is mounted onto a mobile base 32. The mobile base 32 may be a truck or road vehicle, or a motorized special purpose camera crane base or dolly. Typically, the mobile base 32 will have wheels 34 which drive and steer the mobile base. Four-wheel drive and four-wheel steering may be provided. For smaller scale cranes 30, e.g., up to about 15 feet, the mobile base 32 may be un-motorized, and may be moved or pushed by hand. For larger versions of the telescoping crane 30, or when required due to ground conditions or other use requirements, the mobile base 32 can have electric motors, or internal combustion engines, for driving the wheels 34.

As shown in FIGS. 1 and 2, the crane 30 has a telescoping crane arm 35 pivotally mounted on an axle 70 on a U-shaped center post 46 which is rotatably mounted on the column 36 supported on the mobile base 32. The crane arm can therefore pivot in elevation and rotate in azimuth or panning direction. The column 36 may be automatically leveled, as described in my U.S. Pat. No. 4,747,424, incorporated herein by reference, to maintain the crane 36 in a level orientation as the mobile base 32 moves over uneven ground.

Figure 3:
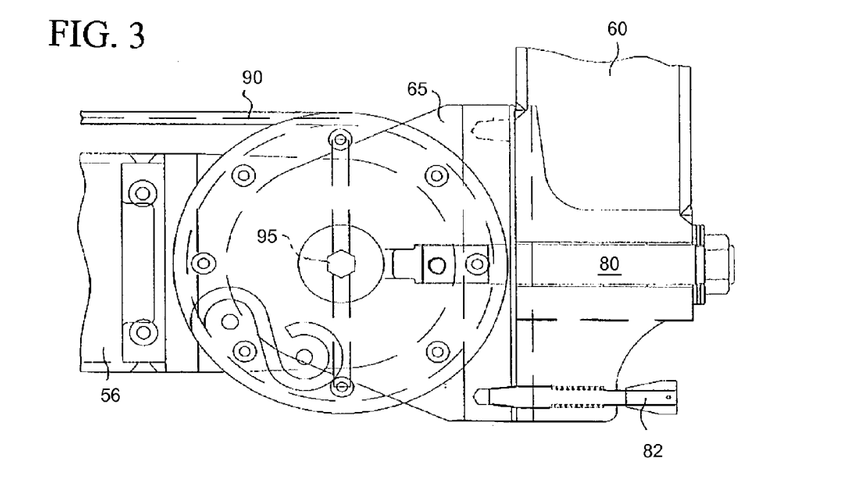
FIG. 3 is an enlarged side view, in part section, of the nose bracket of the crane arm shown in FIG. 2.
Figure 4:
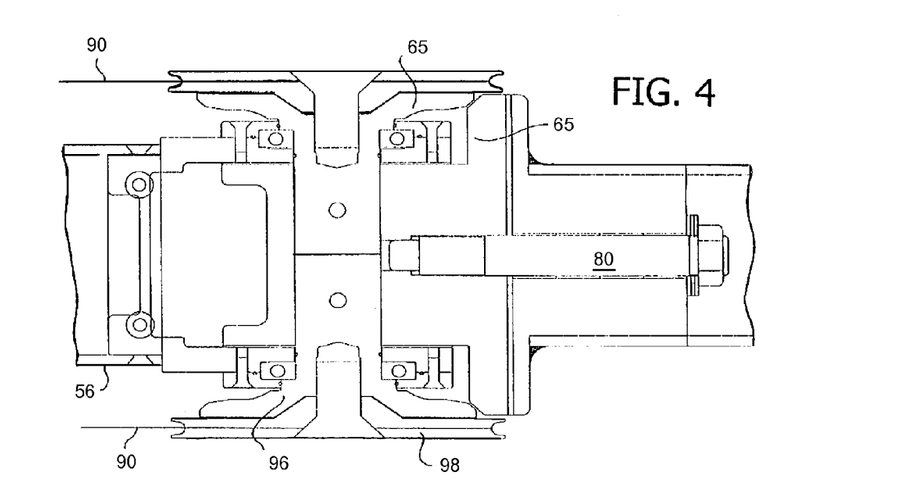
FIG. 4 is a plan view of the nose bracket shown in FIG. 3.

Referring to FIGS. 2-4 a nose bracket 65 is attached to split nose axles 96 pivotally attached at the front end of the front or inner section of the telescoping crane arm 35. A riser, drop-down plate or extension 60 can be attached to the nose bracket 65 with a mounting bolt 80 and a quick release position pin 82. A clutch 95 shown in FIG. 3 may optionally be provided between the nose bracket 65 and the nose axles 96, to allow the camera platform 60 to slip relative to the axles, in case an unexpected large external torque is applied to the camera platform, for example resulting from a collision of the platform into a building. The clutch 95 may be effectively locked out by installing a locking bolt into a locking hole extending through the pulley 98 and into the axles 96 on each side. With the locking bolts in place, the nose bracket 65 is effectively locked in place relative to the pulleys, the clutch 95 is locked out, and no slippage can occur. The camera platform, in this case the extension plate 60 then remains securely connected to the cable leveling system, even if the axle bolts 95 are not sufficiently tightened. The locking bolts may be designed to shear off at a force level low enough to avoid significant damage in the event that the camera platform is accidentally maneuvered into an immovable object. Multiple lock out holes are provided to accommodate stretching of the cables 90.

In the configuration shown, an extension 60 is used and forms the camera platform, and a remote camera head 62 is attached at the front end of the extension 60. The camera head 62 is described in my U.S. Pat. No. 7,209,176, incorporated herein by reference. Of course, other camera heads may also be used. Alternatively, other camera support plates, risers, drop downs or accessories may be attached directly to the nose bracket 65, with no extension 60 and/or camera head 62 being used. In the configuration shown, a camera 64 is attached to a camera platform on the camera head 62. The camera head 62, if used, can provide controlled angular camera movement about pan, tilt, and roll axes, independent of movement of the crane arm 35.

The crane 30 has a hydraulic system 50 which provides the driving force for extending and retracting the crane arm 35. The crane 30 also includes a mechanical cable leveling system to maintain the nose bracket 65 in a horizontal or level orientation, regardless of the elevation angle AA (shown in FIG. 2) of the crane arm 35. In cranes having a cable leveling system, the cable holds the camera platform against downward pivoting movement. Ordinarily, no mechanism is needed or provided to hold the camera platform against upward pivoting movement, since the weight of payload and the camera platform generally automatically prevent such movement. The cable leveling system may include a hydraulically operated compensator, to compensate for stretching of the cables. These systems are described in my U.S. Pat. No. 7,128,479, incorporated herein by reference. While the hydraulically operated compensator works well for compensating for cable stretching, it generally does not operate fast enough to effectively compensate for kinetic forces displacing the camera platform from level. It also cannot compensate for upward pivoting movement of the camera platform.

Figure 5:
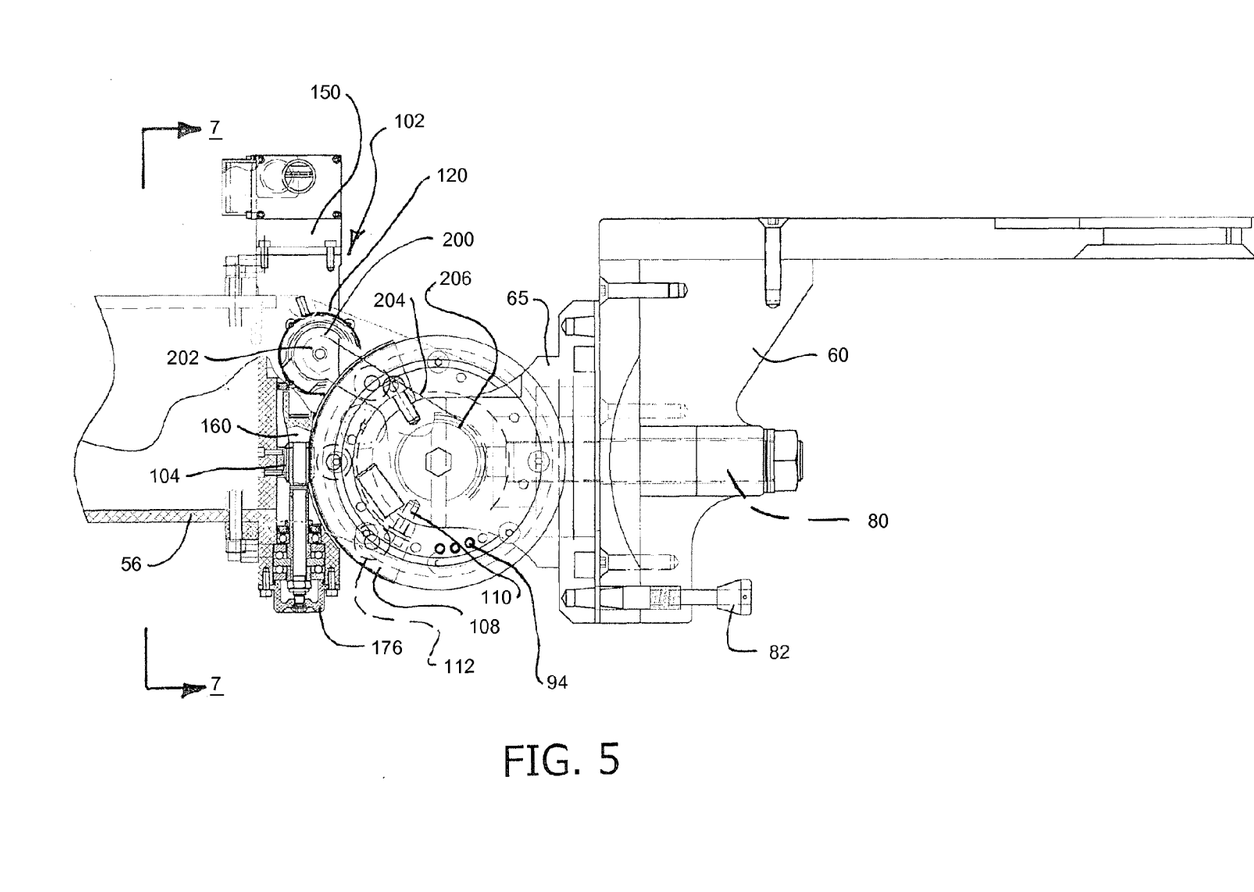
FIG. 5 is a side view in part section of electrical stabilizing system acting on a pitch axis (angle of elevation).
Figure 6:
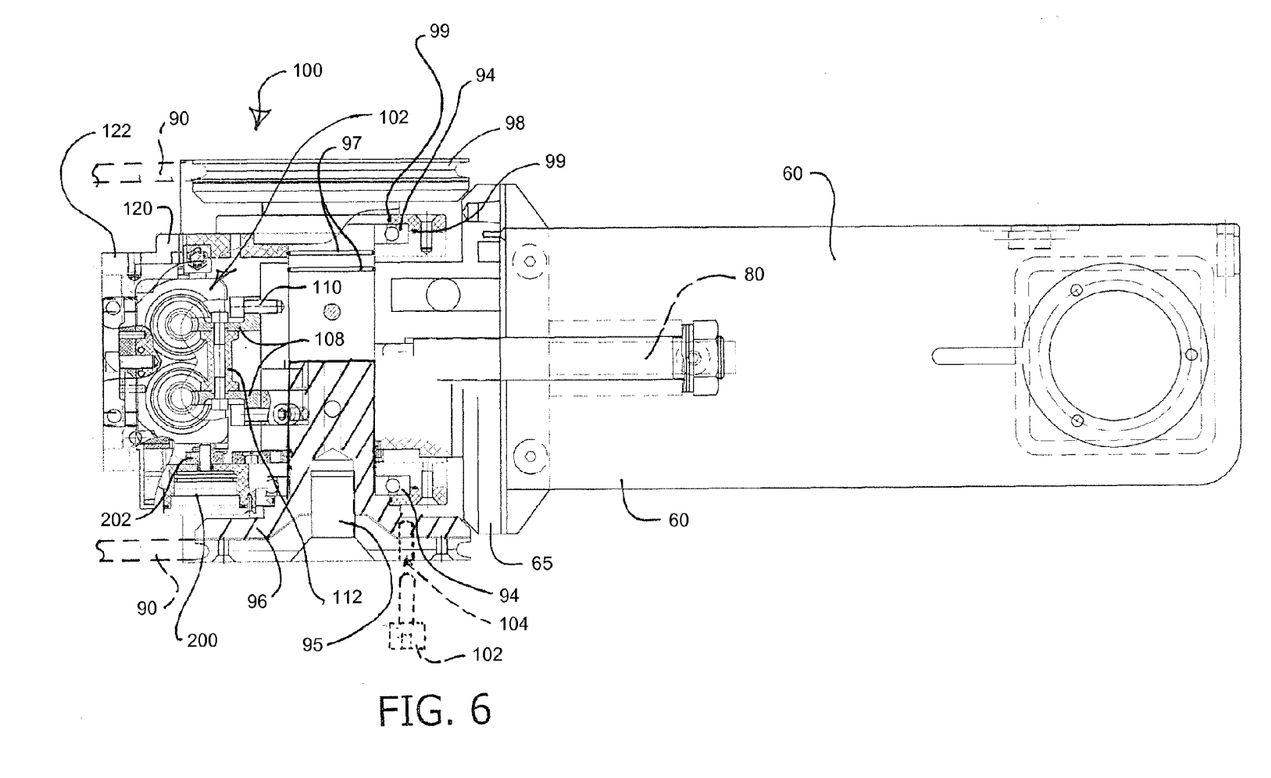
FIG. 6 is a top view in part section of the system shown in FIG. 5.
Figure 7:
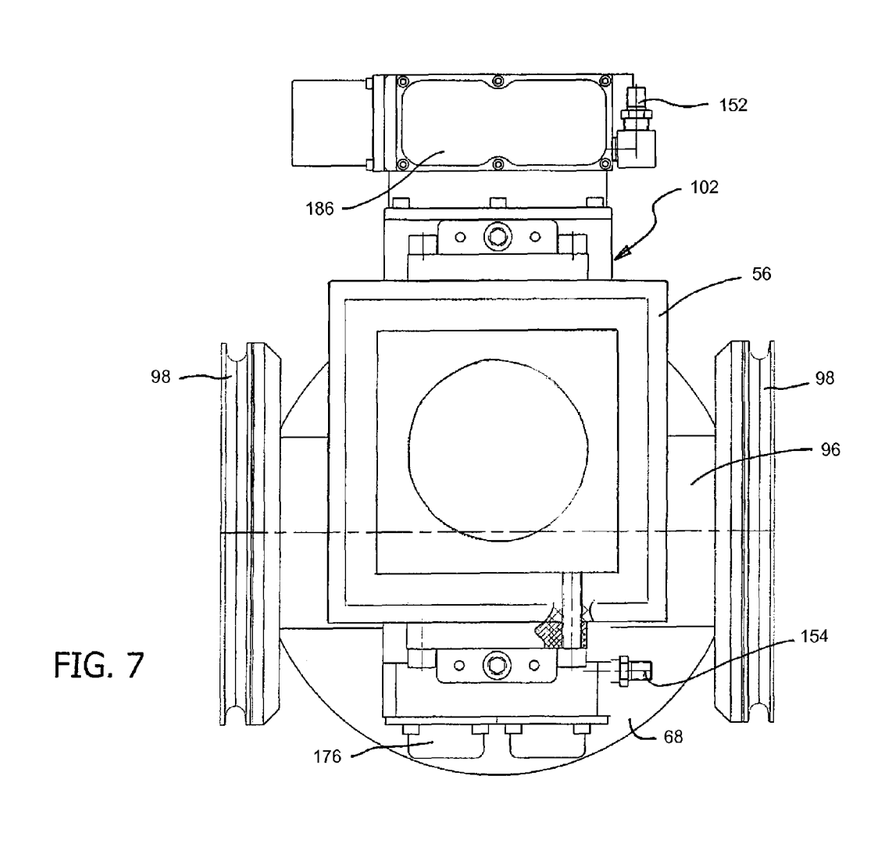
FIG. 7 is a section view taken along line 7-7 of FIG. 5.

Turning now to FIGS. 5-7, an anti-backlash camera platform stabilizing system 100 is installable at the front end 56 of the crane arm 35, to maintain the camera platform, in this case the extension plate 60, in a stable horizontal position. The stabilizing system 100 includes and electric drive assembly 102, gear sectors attached directly or indirectly to the extension plate 60, position sensors and an electronic controller. The stabilizing system 100 may be used on various types of cranes, including cranes that are purely electrically driven, hydraulically driven, or even on manually maneuvered cranes. The crane may be telescopically extendable or have a fixed length. The leveling system may use linkage bars, cables, or other designs.

Figure 8:
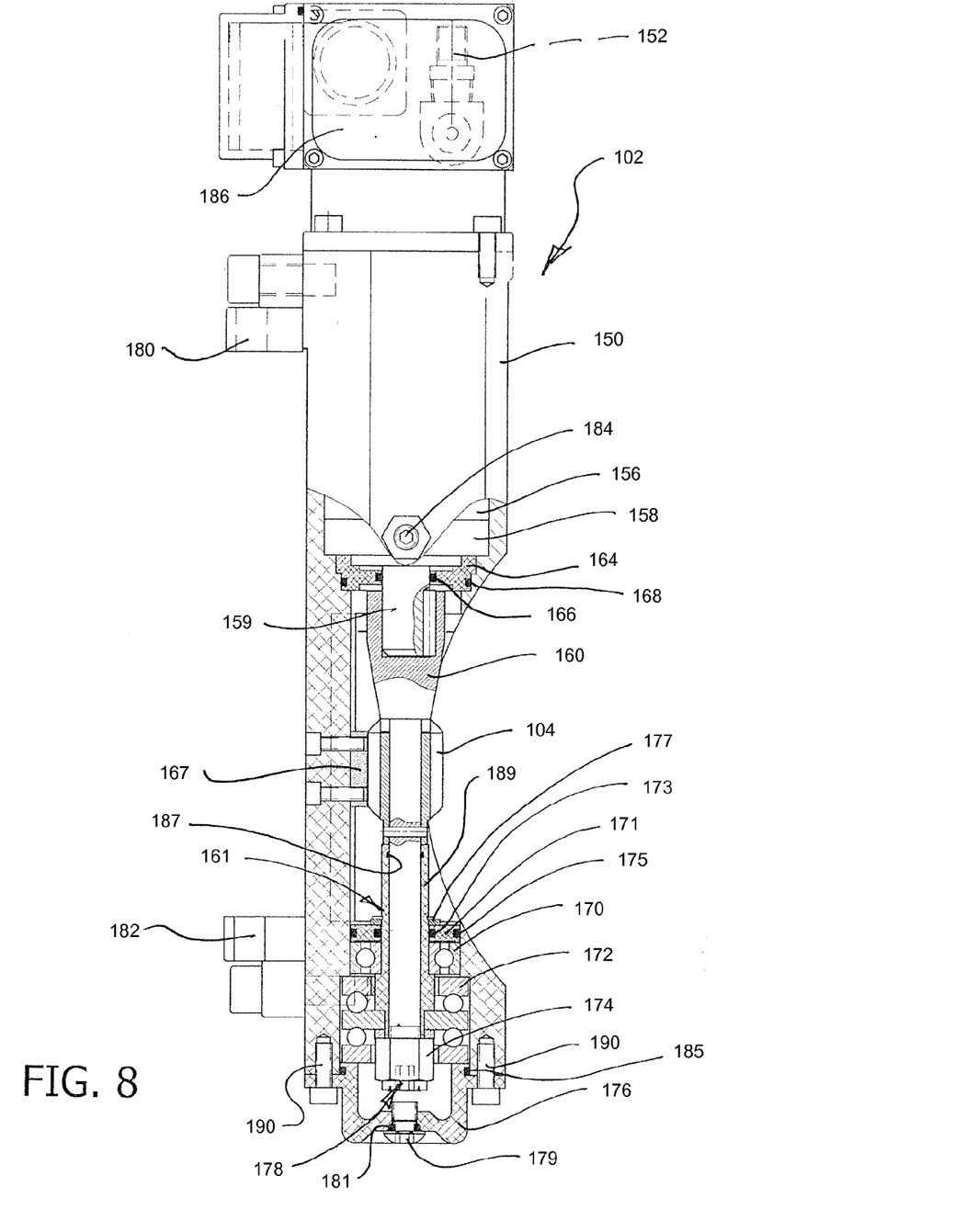
FIG. 8 is an enlarged side view in part section of a worm drive motor assembly as used in the stabilizing system shown in FIGS. 5-7.
Figure 9:
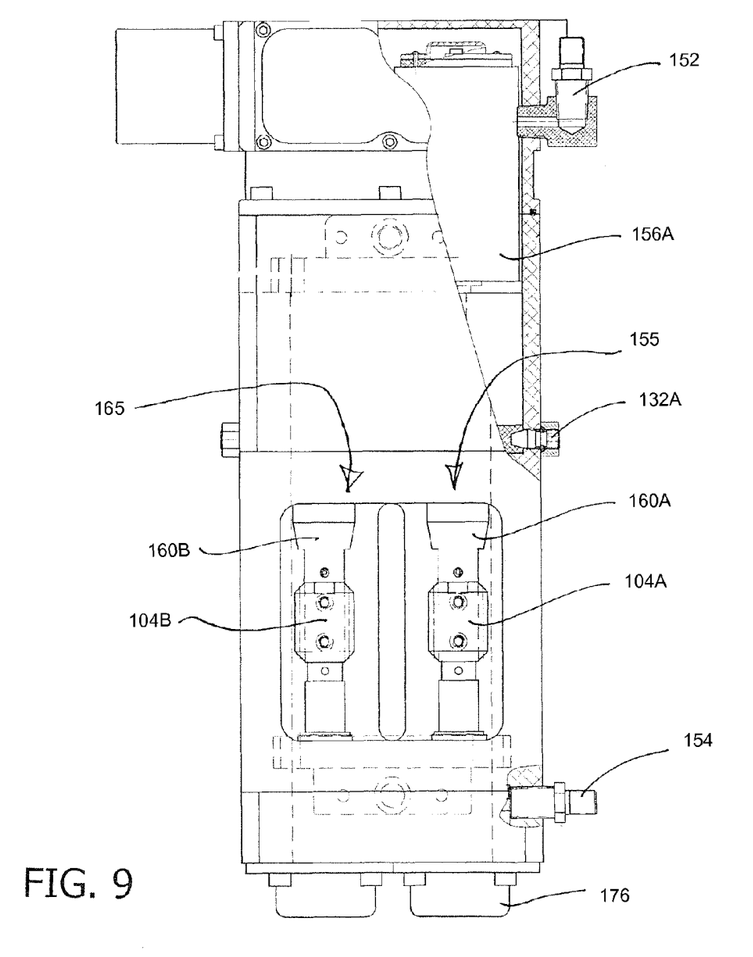
FIG. 9 is a front view in part section of the assembly shown in FIG. 8.
Figure 10:
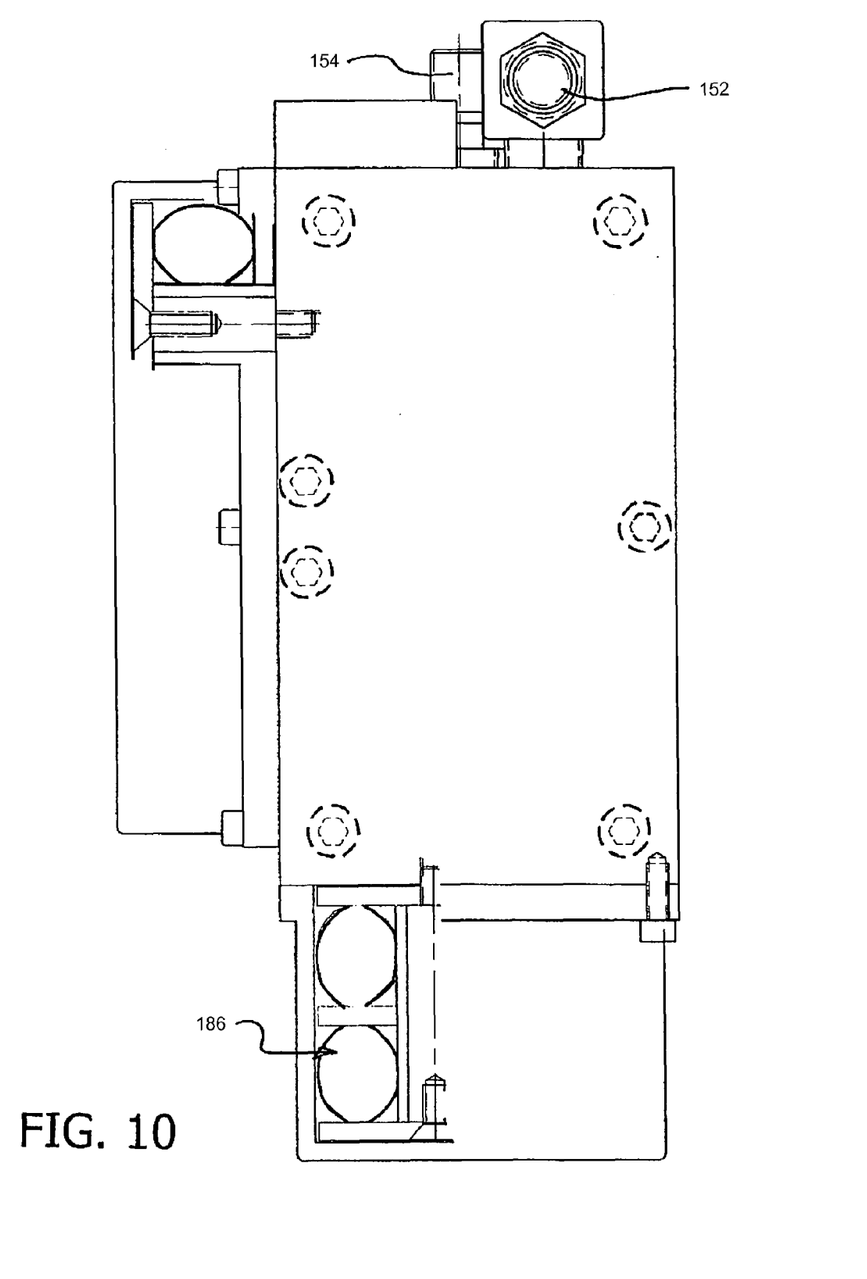
FIG. 10 is a top view of the assembly shown in FIG. 8.
Figure 11:
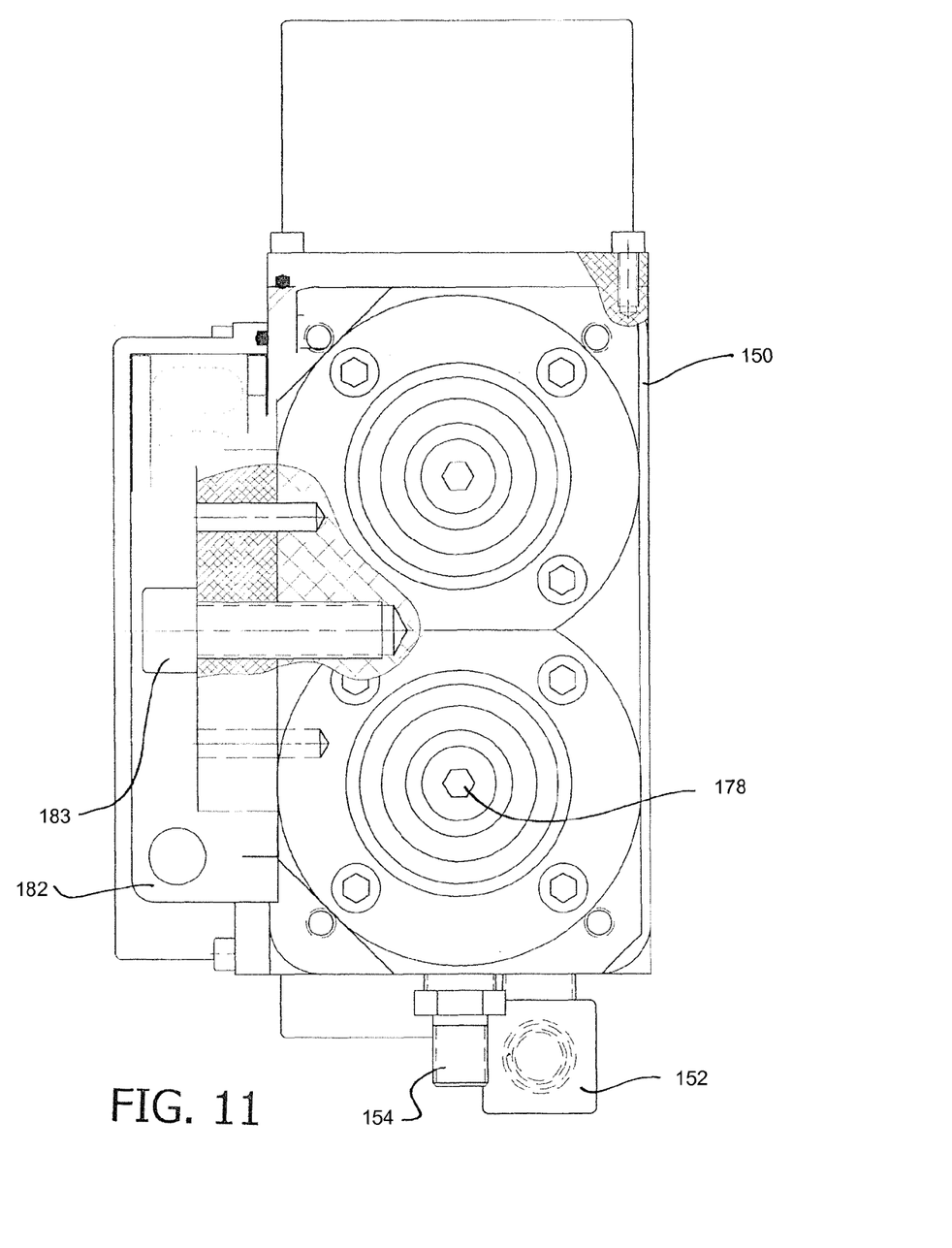
FIG. 11 is a bottom view in part section of the assembly shown in FIG. 8.

The drive assembly 102 is shown in FIGS. 8-11. As shown in FIGS. 8 and 9, the drive assembly 102 includes a chassis or housing 150 having upper and lower mounting brackets 180 and 182, for mounting the drive assembly 102 onto the crane arm 35. The drive assembly includes two drive lines shown as 155 and 165 in FIG. 9. The drive lines 155 and 165 may be similar or even identical. Accordingly, for purpose of explanation here, only the first drive line 155, shown on the right side of the drive assembly 102 in FIG. 9, will be described. It should be understood that this description applies as well to the second drive line 165. In FIG. 9, element numbers of the first drive line 155 have an "A" suffix while element numbers of the second drive line have a "B" suffix. The drive line element numbers in FIG. 8 may be of either drive line 155 or 165, depending on section view, and consequently have no suffix. Accordingly, where the drawings show element numbers having an "A" or a "B" suffix, reference to that element number below, without a suffix, refers to that element in the first drive line 155 or the second drive line 165, or both.

Referring to FIG. 8, the drive line 155 includes an electric motor 156 which drives a gear reduction within a gear box 158. The electric motor 156 is typically a low voltage DC motor, for example a motor designed to run on a maximum of 28 VDC. This allows the motor 156 to be powered via batteries that are typically already on the crane 30 or mobile base 32, without a step-up or AC converters. The gear reduction, gear box and the motor may be provided as a single combined and sealed unit.

Referring still to FIG. 8, an upper spacer 164 supports the gearbox laterally or radially within a seat in the chassis 150. An outer seal 168 seals the spacer against the chassis seat. An inner seal 166 seals an output shaft 159 of the gear box 158 against the spacer 164. The seals 166 and 168, and other seals described below, may be o-ring seals. A worm shaft 160 is connected to the output shaft 159. A worm 104 is secured in place on the worm shaft. A worm backing plate 167 is attached to the housing 150 in alignment with each worm 104. The worm backing plate 167 has a cylindrical surface spaced 0.001-0.005 inches away from the worm, and ordinarily does not contact the worm. The worm backing plate prevents deflection or disengagement of the worm from the worm gear segments, under extreme load conditions. A thrust bearing 172 is contained within a bore at the bottom end of the chassis 150. The thrust bearing 172 is secured in place by a thrust bearing cover 176 attached to the bottom end of the chassis 150 via cap screws 190. The thrust bearing 172 accordingly is fixed in position in the chassis, for resisting axial loads (loads acting vertically up or down in FIG. 8). A plug 179 is sealed to the thrust bearing cover 176 via a seal ring 181. Similarly, the thrust bearing cover 176 is sealed to the chassis 150 via a seal ring 185. The shaft 189 of the thrust bearing 172 is attached to the worm 104 via a pin, or a keyway. A shaft seal 187 seals the inner surface of the shaft 189, with the seal 173 sealing the outer surface. As a result, the components of the drive assembly 102 are sealed from the environment, except for the worms, the backing plates, and the shaft sections adjacent to the worms.

A radial ball bearing 170 is positioned within a bore in the chassis 150, above the thrust bearing, in FIG. 8. A lower spacer 171 on top of the radial bearing is sealed against the bore in the chassis via an outer seal 175. The lower section 161 of the worm shaft 160 extends through the spacer 171, the radial ball bearing 170 and the thrust bearing 172. An inner seal 173 on the spacer 171 seals the spacer against the lower section 161 of the worm shaft 160. A retaining ring 177 is secured around the lower section 161 of the worm shaft 160. A cap nut 174 is threaded onto the lower end of the worm shaft 160. Accordingly, the worm shaft 160 can freely rotate, but cannot move in the axial or vertical direction. .

As shown in FIGS. 7-11, an upper gas purge port 152 connects into an electronics box 186 at the top of the chassis 150. Similarly, a lower gas purge port 154 connects into the space within the lower end of the chassis 150. Electronic components associated with driving the motors 156 may be contained in the electronics box 186. Referring to FIG. 8, the motor 156 and gearbox 158 are sealed against the environment via the upper spacer 164 and seals 164 and 166. Similarly, the bearings 170 and 172 are sealed against the environment by the lower spacer 171 and seals 173 and 175. Accordingly, all of the electrical components and moving parts of the drive lines 155 and 165 are sealed off from the environment, except for the worm 104 and the worm shaft 160.

Figure 13:
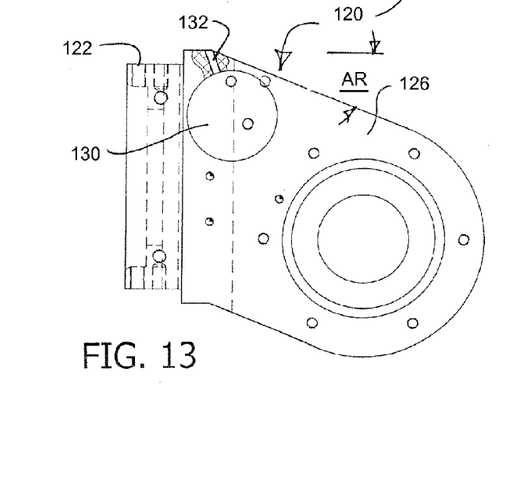
FIG. 13 is a side view of the nose clevis shown in FIGS. 5 and 6.
Figure 14:
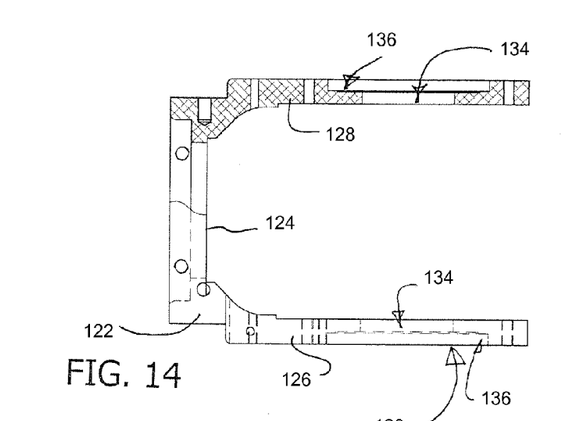
FIG. 14 is a top view of the nose clevis shown in FIG. 13.
Figure 15:
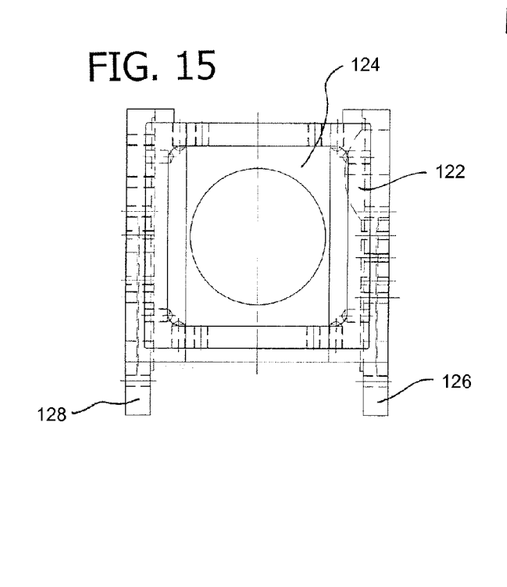
FIG. 15 is a back end view of the nose clevis shown in FIG. 13.
Figure 16:
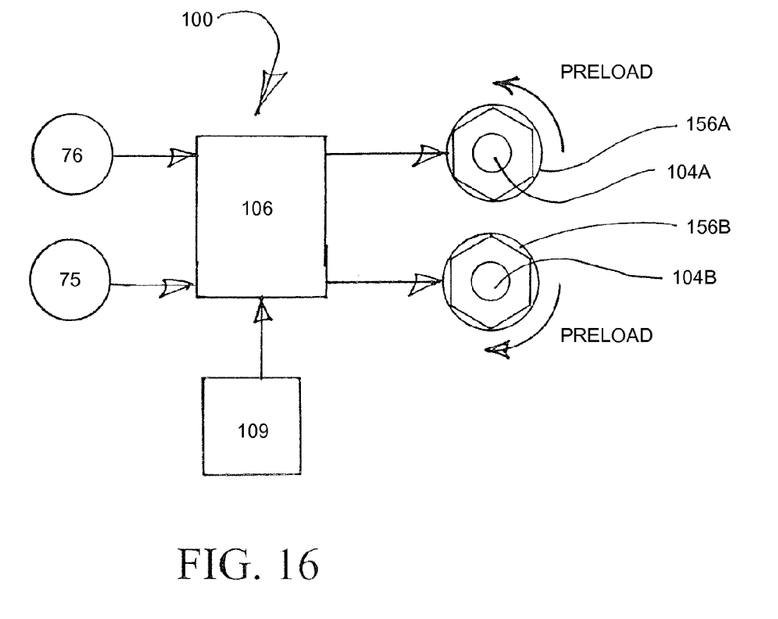
FIG. 16 is a schematic diagram illustrating interconnections of the system components.

Turning now to FIGS. 13-15, the drive assembly 102 is supported at the front end of the crane arm 35 on a nose clevis 120. The back end 122 of the nose clevis 120 is adapted to be securely attached onto or into the front end 56 of the crane arm 35. In the design shown, where the crane arm 135 is made of square tube sections, the back end 122 of the nose clevis 120 is formed as a square frame that fits into the square section of the crane arm, and is then bolted in place.

Left and right arms 126 and 128 are joined to a back plate 124 of the nose clevis 120. An opening 130 in the right arm 126 is adapted to receive a nose potentiometer 75 or other angular position sensor, secured with a set screw in threaded hole 132. Both the right arm 126 and the left arm 128 have an outer counter bore 136 for holding a bearing 94 (shown in FIG. 6) in place, and an inner axle bore 134. Also shown in FIG. 6, each nose axle 96 extends through an axle bores 134. As shown in FIG. 13, the arms 126 and 128 extend down at an angle AR. As a result, the axle 70 is offset below the center line of the crane arm 35. Referring to FIG. 6, the assembly shown is symmetrical along the centerline extending through the center of the bolt 80. As FIG. 6 is a partial section view, for purpose of illustration, not all of the components present are shown on both sides. It should be understood though that components shown on one side are also present on the other side. Axle seals 97, such as o-rings, seal each nose axle 96 against the nose bracket 65, while also allowing the axle to pivot. Bearing cap seals 99 similarly seal the bearings 94.

Figure 12:
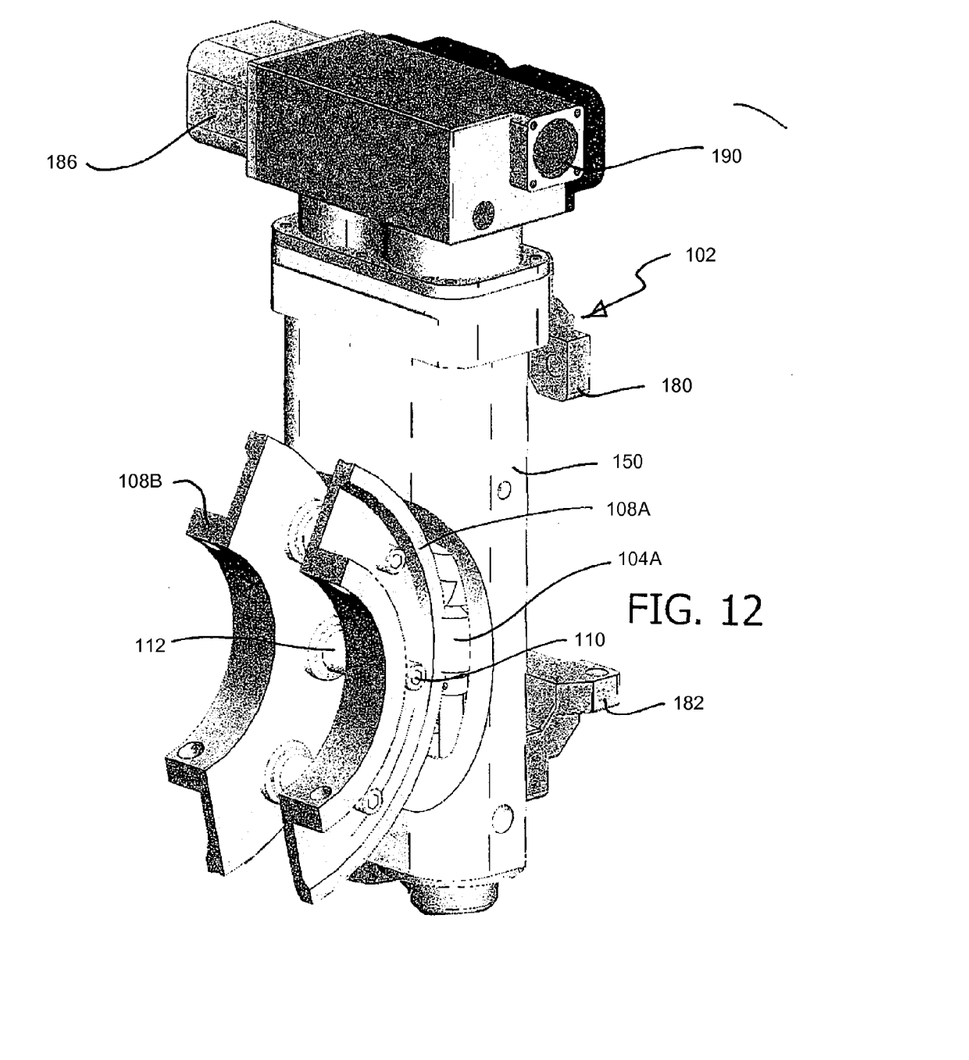
FIG. 12 is a perspective view of the assembly shown in FIG. 8 in relation to the worm gear segments shown in FIGS. 5 and 6.

Referring to FIG. 5, worm gear segments 108 are attached to the nose bracket 65 via bolts 110. As shown in FIGS. 5 and 12, the segments 108 are also attached to each other via segment bolts 144 and segment spacers 112. As shown in FIG. 5, the potentiometer 75 is secured in place on the nose clevis 120. A belt 204 extends around a sprocket 202 on a shaft of the potentiometer 75, and around a nose sprocket 206 on the nose bracket 65.

As shown in FIG. 2, a post potentiometer 76 detects the angle of elevation AA of the crane arm 35. The post potentiometer 76 may operate in the same way as the nose potentiometer 75 as described above, i.e., via a belt connecting a sprocket on the arm axle 70 with a sprocket on the potentiometer 76.

In use, the drive assembly 102 is installed as shown in FIGS. 5 and 6. Specifically, the nose clevis 120 is attached to the end 56 of the crane arm 35, as described above. The nose bracket 65, axles 96, bearings 94, pulleys 98, worm gear segments 108 are assembled together onto the nose clevis 120. This is generally performed with the nose clevis 120 installed on the crane arm, but it may alternatively be performed with the nose clevis 120 on an assembly bench, with the nose clevis installed on the end of the crane as a completed assembly. The nose bracket 65 is pivoted down to rotate the worm gear segments 108 to a position away from the back plate 124 of the nose clevis 120. The drive assembly 102 is attached to the end 56 of the arm via bolts passing through the mounting brackets 180 and 182 and threading into the end of the arm. The nose bracket 65 is then pivoted back up, bringing the worm gear segments 108 into contact with the worms 104. Alternatively, before they are bolted in place on the nose bracket 65, the worm gear segments 108 may be manually meshed with the worms, by sliding them in from the side. The worm gear segments 108 can then be secured in place via the bolts 110.

To get the worms to mesh with the worm gear segments, the worms are rotated manually by removing an end plug or bolt 179 from the thrust bearing cover 176, as shown in FIG. 8. A wrench may then be inserted into a splined opening 178 in the bottom end of the worm shaft 160, to rotate the worm shaft 160 and the worm 104. The shaft is rotated until the worms engage with the worm shafts. The wrench may then be removed and the plug 179 replaced.

The payload, such as the camera and any accessories, including manual or remote camera heads, isolators, risers, battery packs, wireless equipment, etc. are mounted on the camera platform 60. The crane arm 35 is moved into a level position. If used, the hydraulic cable tensioners described in my U.S. Pat. No. 7,128,479 are actuated to level the camera platform. The stabilizing system 100 is powered on connecting batteries or other power supply 109 to an electronic controller 106. The controller 106 is set up to provide opposite preload voltage to each motor 156A and 156B. For example, under nominal conditions, where the camera platform is already level, the controller 106 may apply +1 volt to motor 156A and −1 volt to motor 156B. Consequently, the motors apply torque to the worms acting in opposite directions. This preload removes backlash from the system 100 by causing each worm to positively mesh with its associated worm gear segment, and with the worms acting in opposite directions. The front face of the first worm 104A is engaged against the first worm gear segment 108A, while the back face of the second worm 104B is engaged against the second worm segment 108B. The camera platform 60 is consequently substantially held in a level position, with virtually zero play. When a corrective movement is initiated, movement of the camera platform in either direction is virtually instantaneous (i.e., with no delay perceptible by the crane operator). It is also very smooth, since there is virtually no initial free acceleration of the worm before the worm begins to drive the worm gear segment. Lurching movements characteristic of systems having no anti-backlash elements is avoided.

As the crane arm 35 moves during a filming sequence, various forces may act to deflect the camera platform from its level position. The stabilizing system 100 acts to overcome these forces and keep the camera platform level, as follows. The base potentiometer 76 determines the angle AA and provides a voltage signal to the controller 106 proportional to the angle AA. Due to the position of the base potentiometer adjacent to the axle 70, and high rigidity of the crane at this location, any errors in measuring angle AA are insignificant. The nose potentiometer 105 measures the angular difference between horizontal and the actual orientation of the camera platform 60, and similarly provides a proportional signal to the controller 106. The controller adds the signals from the potentiometers. A zero sum indicates a level condition. A non-zero sum indicates an out of level condition. The controller then acts to return the camera platform back to level, via control of the motors 156.

Specifically, the controller 106 applies a correction voltage to each motor, causing the motors to pivot the camera platform in the direction back to level. At any instant, both motors are provided with the substantially the same correction voltage. When the correction voltage exceeds the preload voltage, which is generally the case when the system encounters any more than nominal deflection of the camera platform, both motors drive the camera platform in the same direction. Accordingly, with both motors working together, a large amount of torque can be exerted through the gear reduction and worm gear, to rapidly return the camera platform to level.

In practice, the system 100 can apply sufficient torque with sufficient speed to maintain the camera platform in virtually a steady state level position, except under extreme loading conditions. Since the gear reductions and worms are under constant preload, there is virtually no play or backlash in the mechanical connections between the motors and the camera platforms. As a result, driving the motors causes virtually instantaneous corrective movement to the camera platform. With backlash removed from the mechanical driving components, the controller 106 can operate at a high gain level. This results in very fast corrective movements.

The motors may be relatively small and lightweight, while still achieving relatively high torque output, via the gear reduction. For example, the gear reduction in the gearbox may provide a 10 or 12:1 reduction. The worm may provide an additional 20 or 25:1 reduction. The motor can therefore accelerate quickly and apply large corrective forces on the camera platform. In general, the lead angle on the worms is large enough to allow the drive assembly 102 to be back driven. With the system 100 turned off, this allows the camera platform to be manually displaced from level, as may be convenient to switch lenses, or to make other changes or adjustments to the camera.

During operation of the system 100, the preload voltage is constantly maintained. As a result, even when the correction voltage exceeds the preload voltage, the anti-backlash design is maintained. Specifically, since the preload voltage will add to the correction voltage of the first motor, and subtract from the correction voltage of the second motor, the motors apply different amounts of torque, even when acting in the same direction. One motor acts as a "leading" motor while the other acts as a "lagging" motor, with the torque of both motors adding together to apply corrective movement to the camera platform.

When the system applies a corrective movement, the front face of the leading worm is in contact with and drives the first worm gear segment. At the same time, the front face of the lagging worm is in contact with and drives the second worm gear segment, although with less torque than the leading worm. The positive torque applied by both worms adds together. During the corrective movement, since the front face of lagging worm is driving the second worm gear segment, in principal, momentarily there is no anti-backlash in the system, since both worms are driving in the same direction. However, since the presence of backlash only matters during start up of a movement, this momentary lack of an anti-backlash feature is irrelevant. As the camera platform approaches level, the controller reduces the correction voltage. When the correction voltage drops below the preload voltage, the action of the lagging worm reverses, with the lagging worm now applying torque, via contact of the rear face of the lagging worm, opposite from the torque applied by the leading worm. This re-establishes the anti-backlash design, as the camera platform once again approaches the level position.

Although the stabilizing system 100 is electrically operated, it can be reliably be used in wet environments. All of the electrical components and connections in the drive assembly are sealed. The spaces containing the electrical components, as well as the bearings, may also be purged with nitrogen gas via the purge fittings 152 and 154 to reduce potential for corrosion. In addition, the nitrogen (or other inert gas), may be used to pressurize the internal spaces of the drive assembly 102, to avoid entry of water or water vapor, in the event of a seal failure resulting in a leak. The potentiometers are also sealed. Accordingly, the front end 56 of the crane arm 35 may even be submerged in water, for underwater filming, without interfering with operation of the stabilizing system 100.

The potentiometers 75 and 76 sense the relative positions of the camera platform 60 and crane arm 35, via a mechanical link to them. In the design shown, the mechanical links are the belts 204. Other equivalent links may also be used, including links comprising, gears, bar linkages, cams, etc. Non-mechanical links may also be used, such as optical or electrical links. The potentiometers effectively sense positions relative to the post 46. If the post is not vertical, for example because the mobile base is on an incline, the system 100 will maintain the camera platform level relative to the incline. To have the system 100 maintain the camera platform level relative to gravity, the potentiometers and the controller may be initialized to account for the angle of incline of the mobile base. Accordingly, the terms horizontal or level as used here may mean absolute or relatively horizontal or level.

If the hydraulic cable tensioners described in my U.S. Pat. No. 7,128,479 are used, they may also be linked to the controller 106. The controller 106 may then control operation of hydraulic valves, to operate the hydraulic cable tensioners, as well as the motors 156.

Thus, a novel camera crane, hydraulic system, actuator and valve have been shown and described. Changes and substitution may of course he made without departure from the spirit and scope of the invention. The invention, therefore, should not be limited, except to the following claims and their equivalents.

The invention claimed is:

1. A camera crane comprising:
a telescopically extendible arm having a front end and a back end;
a camera platform supported at the front end of the arm;
a mechanical leveling system linked to the camera platform, to keep the camera platform in a substantially horizontal position,
a counter weight moveable along the arm from a first position adjacent to the back end of the arm to a second position between the back end and the front end of the arm;
at least one actuator on the arm, for telescopically extending and retracting the arm; and a camera platform stabilizing system including a first sensor for sensing the elevation angle of the arm, a second sensor on the camera platform for sensing the angular position of the camera platform, first and second electric motors driving the camera platform, and a controller electrically connected to the first and second sensors, and to the first and second motors, and with the controller providing a positive preload to the first motor and a negative preload to the second motor, and with the controller controlling the motors to maintain the camera platform in a stabilized position.

2. The camera crane of claim 1 with the first and second electric motors driving the camera platform through first and second gear assemblies each comprising a gear reduction unit.

3. The camera crane of claim 2 with the gear assemblies each further comprising a worm engagable to a worm gear segment attached to the camera platform.

4. The camera crane of claim 3 with the first and second motors and the first and second gear assemblies supported in a sealed chassis.

5. A camera crane comprising:
 a support post;
 a crane arm having a front end and a back end, the crane arm pivotally attached to the support post and movable over a range of elevation angles;
 a camera platform supported on a nose bracket pivotally attached to the front end of the arm;
 at least one actuator linked to the arm, for telescopically extending and retracting the arm;
 a counter weight moveable along the arm;
 a camera platform stabilizing system including a first sensor for sensing an angle of the arm relative to the support post, a second sensor on the camera platform or the nose bracket, first and second electric motors positioned to pivot the nose bracket relative to the arm, and a controller electrically connected to the first and second sensors, and to the first and second motors, and with the controller providing a positive preload to the first motor and a negative preload to the second motor, and controlling the motors based on signals from the first sensor and the second sensor.

6. The camera crane of claim 5 with the first and second worm gears formed as arcuate segments spaced apart from each other on the nose bracket and joined to each via spacers.

7. The camera crane of claim 5 wherein the first sensor comprises a potentiometer on the crane arm connected to the nose bracket via a belt.

8. A method for stabilizing a camera platform pivotally supported on a crane arm, comprising:
 providing a first preload signal to a first motor driving the camera platform through a first mechanical linkage;
 providing a second preload signal to a second motor driving the camera platform through a second mechanical linkage, with the first preload signal causing the first motor to exert torque in a first direction, and with the second preload signal causing the second motor to exert torque in a second direction opposite to the first direction;
 sensing movement of the camera platform away from a level position;
 sensing a position of the camera platform;
 comparing the sensed position of the camera platform to an intended position;
 determining a correction signal based on the comparison of the sensed position of the camera platform to the intended position;
 providing the correction signal to the first and second motors, with the correction signal added to the preload signals; and
 driving the first motor with the correction signal and the first preload signal, and driving the second motor with the correction signal and the second preload signal, to move the camera platform towards the intended position.

9. The method of claim 8 wherein the first and second mechanical linkages comprise first and second gear drives, respectively, with the first gear drive including a first worm meshing with a first worm gear segment attached to the camera platform, and with the second gear drive including a second worm meshing with a second gear segment attached to the camera platform.

10. The method of claim 9 further comprising sensing a position of the camera platform by measuring rotation of the camera platform relative to the crane arm.

11. The camera crane of claim 5 with the first and second motors driving first and second worms, respectively, and engaging first and second worm gears attached to the nose bracket.

* * * * *